(12) United States Patent
Okamoto et al.

(10) Patent No.: US 9,141,706 B2
(45) Date of Patent: Sep. 22, 2015

(54) REGION-OF-INTEREST EXTRACTION APPARATUS AND METHOD

(75) Inventors: Masayuki Okamoto, Kawasaki (JP);
Nayuko Watanabe, Yokohama (JP);
Masaaki Kikuchi, Kawasaki (JP);
Takayuki Iida, Tokyo (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 90 days.

(21) Appl. No.: 13/430,106

(22) Filed: Mar. 26, 2012

(65) Prior Publication Data

US 2012/0219225 A1    Aug. 30, 2012

Related U.S. Application Data

(63) Continuation of application No. PCT/JP2009/066983, filed on Sep. 29, 2009.

(51) Int. Cl.
*G06K 9/00* (2006.01)
*G06F 17/30* (2006.01)

(52) U.S. Cl.
CPC ............................. *G06F 17/30867* (2013.01)

(58) Field of Classification Search
None
See application file for complete search history.

(56) References Cited

U.S. PATENT DOCUMENTS

| 7,162,691 | B1* | 1/2007 | Chatterjee et al. | 715/205 |
| 7,330,608 | B2* | 2/2008 | Berkner et al. | 382/298 |
| 7,346,649 | B1* | 3/2008 | Wong | 709/203 |
| 8,024,768 | B2* | 9/2011 | Berger et al. | 725/146 |
| 2005/0086205 | A1* | 4/2005 | Franciosa et al. | 707/3 |
| 2005/0271304 | A1* | 12/2005 | Retterath et al. | 382/305 |
| 2008/0052640 | A1* | 2/2008 | Kraft et al. | 715/811 |
| 2008/0077880 | A1* | 3/2008 | Oygard | 715/799 |
| 2008/0226119 | A1* | 9/2008 | Candelore et al. | 382/100 |
| 2008/0235207 | A1* | 9/2008 | Berkner et al. | 707/5 |
| 2009/0015592 | A1* | 1/2009 | Archana | 345/581 |
| 2009/0208118 | A1* | 8/2009 | Csurka | 382/228 |
| 2009/0300692 | A1* | 12/2009 | Mavlankar et al. | 725/94 |
| 2010/0082699 | A1* | 4/2010 | Miyasa et al. | 707/802 |

FOREIGN PATENT DOCUMENTS

| JP | 2004-86849 | A | 3/2004 |
| JP | 2006-215681 | A | 8/2006 |
| JP | 2008-140377 | A | 6/2008 |
| JP | 2008-160512 | A | 7/2008 |
| JP | 2009-37454 | A | 2/2009 |
| JP | 2009-037454 | A | 2/2009 |
| JP | 2009-211385 | A | 9/2009 |

OTHER PUBLICATIONS

Berna Erol, Kathrin Berkner, Siddharth Joshi. "Multimedia Thumbnails for Documents" MM'06, Oct. 23-37, 2006.*
Lan Yi, Bing Liu, Xiaoli Li. "Eliminating Noisy Information in Web Pages for Data Mining" ACM, 1-58113-737-0/03/0008. 2003.*
English translation of IPRP dated Apr. 26, 2012 from PCT/JP2009/066983; 6 pages.
Japanese Office Action dated May 14, 2013 from corresponding Japanese Patent Application No. 2011-533988; 7 pages.
English translation of the International Search Report of the International Search Authority dated Oct. 27, 2009 from corresponding International Application No. PCT/JP2009/066983.
English translation of the Written Opinion of the International Search Authority dated Oct. 27, 2009 from corresponding International Application No. PCT/JP2009/066983.

* cited by examiner

*Primary Examiner* — Bhavesh Mehta
*Assistant Examiner* — Oneal R Mistry
(74) *Attorney, Agent, or Firm* — Ohlandt, Greeley, Ruggiero & Perle, L.L.P.

(57) ABSTRACT

According to one embodiment, a region-of-interest extraction apparatus includes following units. The acquisition unit acquires a structured document including elements. The first extraction unit extracts block regions including specific elements, from the structured document. The second extraction unit extracts, as a display region, parts of the elements being displayed on a display screen, from the structured document. The third extraction unit extracts a region of interest, in which a user is interested, from the structured document, based on relations between the block regions and the display region.

6 Claims, 12 Drawing Sheets

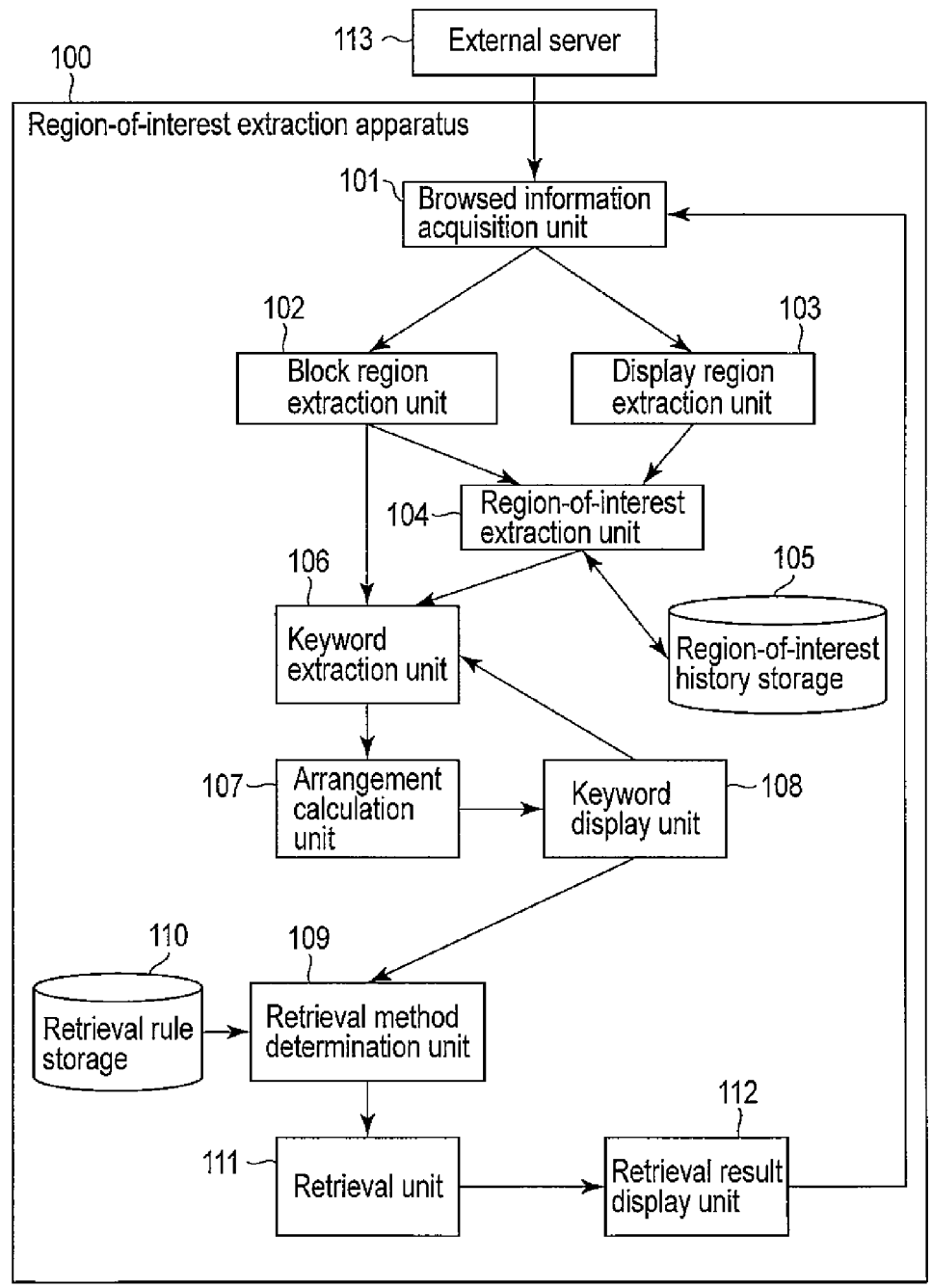
F I G. 1

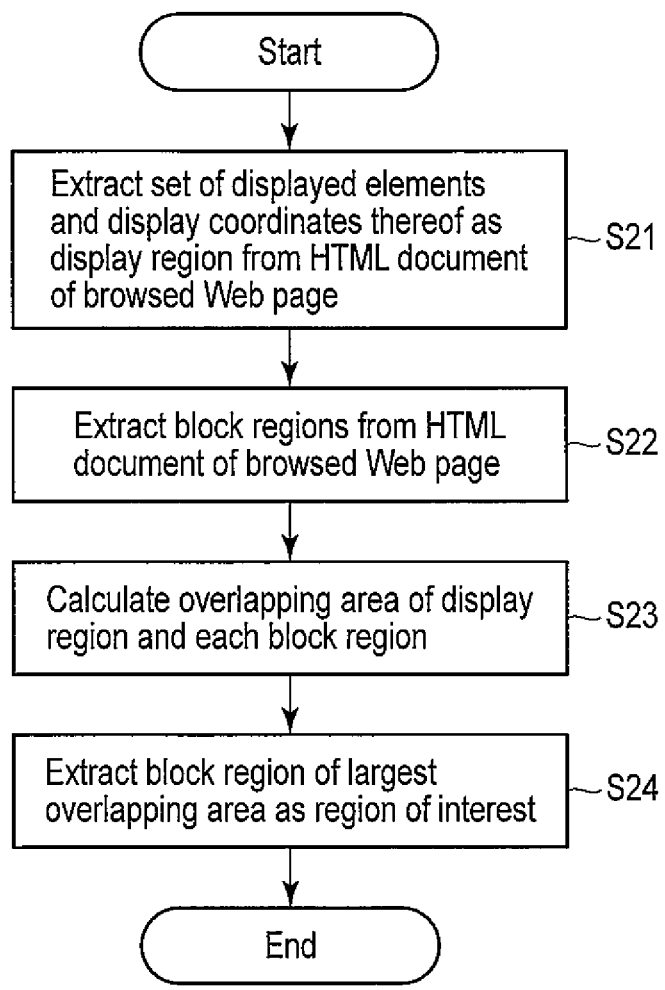
F I G. 2

| Block region ID | URL being browsed | Start position and end position in HTML | Block start coordinates | Block end coordinates |
|---|---|---|---|---|
| 1001 | http://www... | (250,316) | (50,20) | (150,200) |
| 1002 | ... | ... | ... | ... |
| ... | ... | ... | ... | ... |

F I G. 9 A

| Region ID | Time | URL being browsed | Scroll quantity | Block region ID indicating region of interest | Display region | Region-of-interest flag |
|---|---|---|---|---|---|---|
| 1 | 09/28/2009 20:18:00 | http://www... | (100,30) | 1001 | (100,30)-(150,100) | True |
| 2 | 09/28/2009 20:18:00 | http://www... | (100,30) | 1002 | ... | False |
| ... | ... | ... | ... | ... | ... | ... |

F I G. 9 B

REGION-OF-INTEREST EXTRACTION APPARATUS AND METHOD

CROSS REFERENCE TO RELATED APPLICATIONS

This application is a Continuation Application of PCT Application No. PCT/JP2009/066983, filed Sep. 29, 2009, the entire contents of which are incorporated herein by reference.

FIELD

Embodiments described herein relate generally to region-of-interest extraction apparatus and method, which extract a region, in which the user is interested, from text information such as a browsed Web page and a document.

BACKGROUND

When text information (hereinafter referred to as "document") such as a Web page and a manuscript is browsed, the user demands to easily obtain information relating to an interesting keyword that is included in the document. For example, there is disclosed a method of presenting related information for keywords included in a region preset by the user in advance (for example, see JP-A 2009-37454 (KOKAI)). In addition, there is proposed a method of directly selecting a keyword in a Web page and retrieving related information for the selected keyword.

However, in the method disclosed in JP-A 2009-37454 (KOKAI), keyword extraction is performed for a preset screen region without determining in which region in display a user is interested. Therefore, it is impossible to perform keyword extraction in consideration of the region in which the user is interested, or in consideration of relation of the region to another region. In addition, keyword extraction for the whole page has the problem that the number of extracted keywords is large. Besides, in the case of using the method in which the user selects a keyword by manual operation, the keyword selection operation itself is complicated, in particular in small terminals.

Therefore, in the region-of-interest extraction apparatuses, it is required to estimate a keyword in which the user is interested, and estimate a region in which the user is interested at present from the document that the user is browsing, to retrieve information relating to the keyword.

BRIEF DESCRIPTION OF THE DRAWINGS

FIG. 1 is a functional block diagram illustrating a region-of-interest extraction apparatus according to an embodiment.

FIG. 2 is a flowchart of process of extracting a region of interest in the region-of-interest extraction apparatus illustrated in FIG. 1.

FIG. 9A is a diagram illustrating an example of information relating to the region of interest, which is stored in a region-of-interest storage illustrated in FIG. 1.

FIG. 9B is a diagram illustrating an example of the information relating to the region of interest, which is stored in the region-of-interest storage illustrated in FIG. 1.

DETAILED DESCRIPTION

Figure 3:
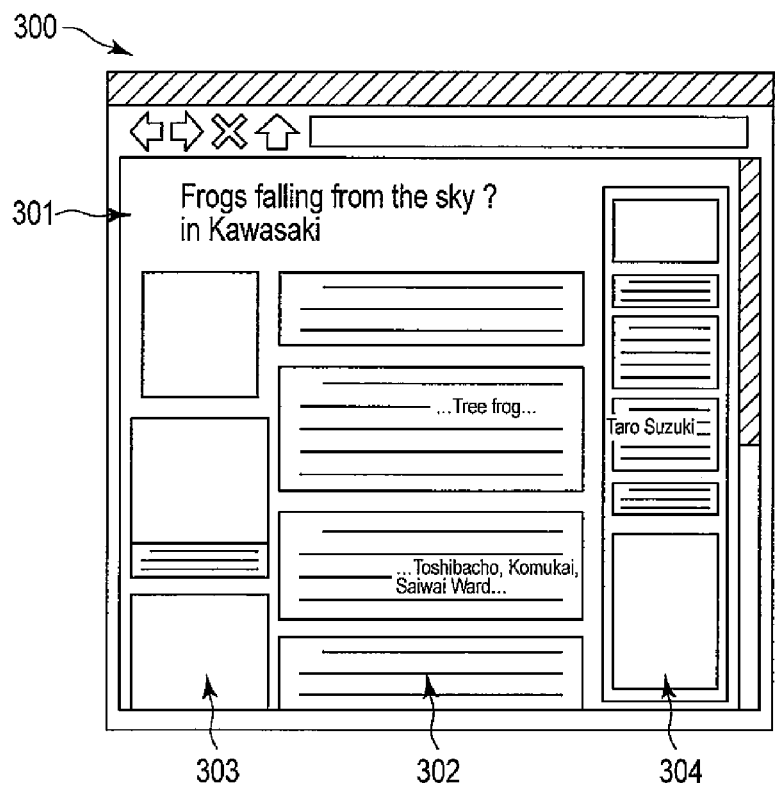
FIG. 3 is a schematic diagram illustrating an example of browsed information.

In general, according to one embodiment, a region-of-interest extraction apparatus includes an acquisition unit, a first extraction unit, a second extraction unit, and a third extraction unit. The acquisition unit is configured to acquire a structured document and a plurality of display coordinates, the structured document including first elements, the display coordinates indicating display positions of the first elements when the structured document is displayed as an image. The first extraction unit is configured to extract block regions from the structured document, the block regions including specific second elements of the first elements. The second extraction unit is configured to specify one or more third elements displayed on a display screen based on the display coordinates, and to extract, as a display region, displayed parts of the third elements from the structured document. The third extraction unit is configured to extract a region of interest, in which a user is interested, from the structured document, based on relations between the second elements in the block regions and the third elements in the display region.

The embodiment provides the region-of-interest extraction apparatus and method, which can extract a region in which the user is interested from a document browsed by the user.

Region-of-interest extraction apparatuses according to embodiments will be explained hereinafter with reference to the accompanying drawings.

FIG. 1 illustrates a configuration example of a region-of-interest extraction apparatus 100 according to one embodiment. In the present embodiment, it is supposed that the region-of-interest extraction apparatus 100 is provided on a terminal of the user. However, the embodiment is not limited to it, but the region-of-interest extraction apparatus 100 may be divided between a plurality of apparatuses. For example, a server may have part of the function of the region-of-interest extraction apparatus 100. In addition, the present embodiment is explained by using a Web page as an example of information or document which the user browses. The Web page may include a still image and a moving image, in addition to text information.

The region-of-interest extraction apparatus 100 illustrated in FIG. 1 includes a browsed information acquisition unit 101, a block region extraction unit 102, a display region extraction unit 103, a region-of-interest extraction unit 104, a region-of-interest storage 105, a keyword extraction unit 106, an arrangement calculation unit 107, a keyword display unit 108, a retrieval method determination unit 109, a retrieval rule storage 110, a retrieval unit 111, and a retrieval result display unit 112.

The browsed information acquisition unit 101 acquires a structured document such as a Hypertext Markup Language (HTML) document which has a plurality of elements, from an external server 113 or the like. In the present embodiment, the browsed information acquisition unit 110 is supposed to be a Web browser which displays an image that corresponds to an HTML document obtained from the external server 113 or the like. The browsed information acquisition unit 101 provides the acquired HTML document and display information, which includes layout (display coordinate) information relating to arrangement of elements (HTML elements) of the HTML document, to the block region extraction unit 102 and the display region extraction unit 103. The HTML document includes a plurality of HTML elements which are described by tags, and each HTML element is formed of a start tag, an end tag, and a character string (or text data) which is surrounded by the tags. The browsed information acquisition unit 106 generates display coordinates, which indicate a position in which the HTML element is displayed on the Web page, for each HTML element. In the present embodiment, the display coordinates indicate coordinates which has the origin that is located in a specific place (for example, the upper left corner) of the whole Web page, and specified by, for example, the scrolling quantity in the browser and the position in the display screen (for example, coordinates which have the origin that is located in the upper left corner of the screen).

The block region extraction unit 102 extracts block regions from the HTML document that is received from the browsed information acquisition unit 101. The block region extraction unit 102 extracts, as a block region, a region which includes a specific HTML element, based on document structure information (for example, a tag) included in the HTML document. In the present embodiment, each block region indicates an HTML element which is enclosed by tags indicating a paragraph, an HTML element which is enclosed by tags indicating an article, an advertisement, or a menu, or an HTML element which includes a specified quantity of text information. The information relating to the block region, which is obtained by the block region extraction unit 102, includes an HTML element and information relating to display coordinates thereof, and illustrated in FIG. 9A as an example.

The display region extraction unit 103 extracts a region (display region) which is displayed on the display screen among the whole Web page, based on the HTML document and the layout information received from the browsed information acquisition unit 101. Specifically, the display region extraction unit 103 specifies one or more HTML elements displayed on the display screen among the HTML elements, based on the display coordinates (layout information), and extracts, as a display region, a set of parts in which the HTML elements are displayed and the display coordinates thereof, from the HTML document.

The region-of-interest extraction unit 104 estimates display content of which block region the user is interested in, based on the block regions extracted by the block region extraction unit 102 and the display region extracted by the display region extraction unit 103, and extracts a region (region of interest) which is estimated that the user is interested in. As an example, the region-of-interest extraction unit 104 calculates and specifies a block region which occupies the largest area in the display region, and determines a part of the block region, which is included in the display region, as the region of interest. The region-of-interest storage 105 stores content of the region of interest that is extracted by the region-of-interest extraction unit 104, in association with the time. The information which is stored in the region-of-interest storage 105 is referred to later by the region-of-interest extraction unit 104.

The keyword extraction unit 106 extracts a keyword depending on user's interest, and a keyword which the user is not directly interested in but is estimated useful, based on the block regions extracted by the block region extraction unit 102 and the region of interest extracted by the region-of-interest extraction unit 104. The arrangement calculation unit 107 calculates display positions of the keywords extracted by the keyword extraction unit 106 based on the number of the extracted keywords, the character string lengths of the extracted keywords, and the sizes of the display region and the region of interest, and determines arrangement. The keyword display unit 108 displays the keywords, in accordance with the arrangement determined by the arrangement calculation unit 107. When one or more keywords are selected from the keywords displayed by the keyword display unit 108, the retrieval method determination unit 109 determines a retrieval method (retrieval service) and a retrieval query, in accordance with rules that are stored in the retrieval rule storage 110. The retrieval rule storage 110 stores rules for determining the retrieval method and the retrieval query by the retrieval method determination unit 109. The retrieval unit 111 performs retrieval for a Web service or a database, based on the retrieval method and the retrieval query determined by the retrieval method determination unit 109, and arranges a retrieval result. The retrieval result display unit 112 displays a list of retrieval results obtained by the retrieval unit 111.

FIG. 2 illustrates a process of extracting a region of interest in the region-of-interest extraction apparatus 100. Extraction processing of the region of interest is started, for example, at predetermined time intervals, when the user changes the browsed Web page, or when the user scrolls. As illustrated in FIG. 2, a set of HTML elements and display coordinates which indicate display positions of these HTML elements are extracted as the display region, the HTML elements being HTML elements displayed on the display screen among HTML elements of an HTML document (corresponding to a structured document) that forms the Web page being browsed by the user (Step S21). Suppose that the browsed information acquisition unit 101 is equipped in advance with a function of specifying in which display coordinates a designated element is located. As a result, a display region is obtained as a set of the HMTL elements and the display coordinates.

Next, one or more block regions are extracted from the HTML document of the Web page which is being browsed by the user (Step S22). As explained later with reference to FIG. 8, block regions may be extracted by using a method of estimating block regions from the display region.

When the display region and the block regions are extracted in Step S21 and Step S22, a range in which the display region overlaps each block region is calculated (Step S23). As a result, a part in which a block region overlapping the display region with a largest area is displayed is extracted as the region of interest (Step S24). In the present embodiment, although the size of the area which each block region occupies in the display region is used as an overlapping degree of the region, the structure is not limited to it, but it is possible to use other standards such as the size of the block region, and the character string length of the text. As another example, in Step S24, a block region which includes an element that is located in the center of the display screen may be extracted as the region of interest, instead of using the overlapping degree of the region. As a further example, the region of interest may be extracted by using at least one of the area which the block region occupies in the display region, the size of the block region, and the percentage of the character string length of the text that is included in the block region. As another example, a region-of-interest extraction result may be stored in the region-of-interest history storage 105, and a block region, an area thereof has increased, or a block region which is continuously displayed for a fixed time is extracted as the region of interest, based on a difference between an extraction result obtained after scrolling of the display picture and the previous extraction result.

Next, an example of region-of-interest extraction is explained with reference to FIG. 3 to FIG. 8.

FIG. 3 illustrates an example of a Web page which is displayed on a display screen 300 with high resolution, in an information browsing apparatus which is provided with the display screen 300. FIG. 3 shows an example of browsed information of a news article in a news site. A headline "Frogs falling from the sky? in Kawasaki" of the article is displayed in an upper region 301 of the display screen 300, and the article divided in paragraphs is displayed in a center region 302 of the display screen 300. In addition, images such as pictures and captions are displayed in a region 303 on the left side of the article, and advertisements and a menu are displayed in a region 304 on the light side of the article.

Figure 4:
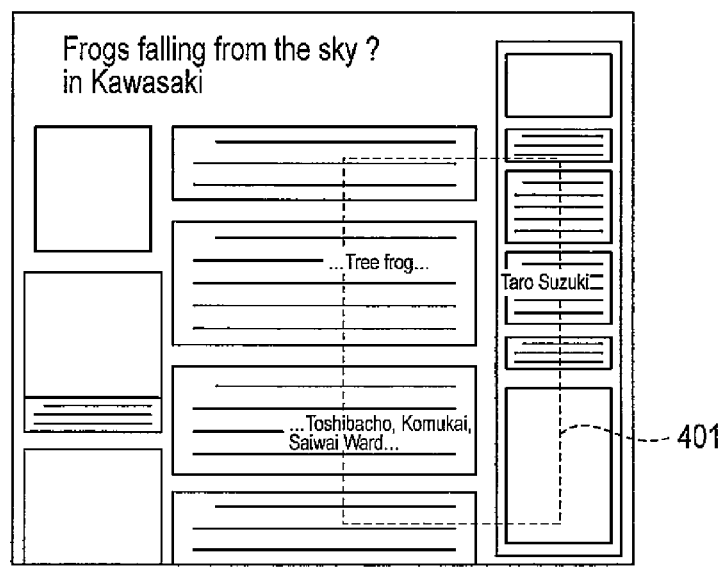
FIG. 4 is a diagram illustrating a range which can be displayed in the case where the browsed information illustrated in FIG. 3 is displayed by a small terminal.

FIG. 4 illustrates an example of a range which can be browsed at a time in the case where the page of FIG. 3 is displayed on a display screen with low resolution, with the layout maintained. As illustrated in FIG. 4, for example, a region 401 enclosed by a broken line is a range which can be displayed at a time in the display screen of low resolution. An example of apparatuses which include a display screen of low resolution is small portable terminals such as mobile phones.

Figure 5:
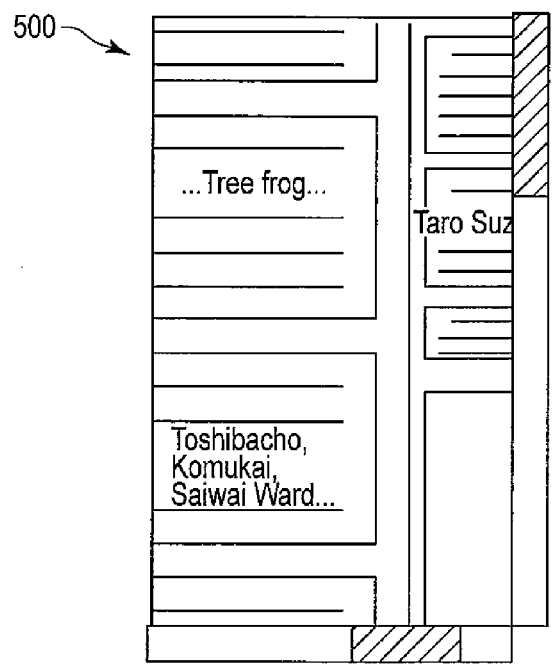
FIG. 5 is a diagram illustrating an example of display content in the case where the browsed information illustrated in FIG. 3 is displayed by a small terminal.

FIG. 5 illustrates an example of a screen 500 in the case where the range 401 illustrated in FIG. 4 is displayed on a display screen of low resolution. When FIG. 3 is compared with FIG. 5, it is clear that a display screen of low resolution has low viewability.

Figure 6:
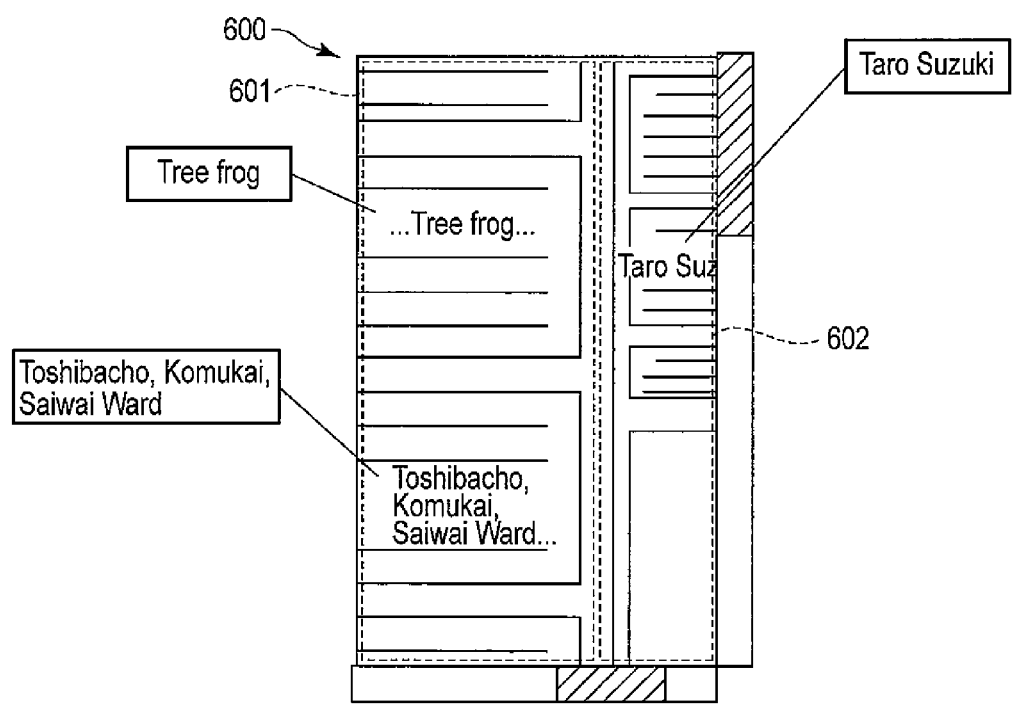
FIG. 6 is a diagram illustrating keywords which can be extracted from a display region in the case where the browsed information illustrated in FIG. 3 is displayed by a small terminal.

FIG. 6 illustrates an example of a method of extracting keywords from words displayed on a screen 600. The example illustrated in FIG. 6 shows that three keywords "tree frog", "Toshibacho, Saiwai Ward", and "Taro Suzuki" can be extracted. For example, when the user browses the page with attention to the article in a left region 601, the word "Taro Suzuki" that is included in the right region 602 is of no interest to the user. In the keyword extraction processing explained later, it is possible to perform processing to avoid extracting a word of no interest to the user as a keyword by extracting the region of interest. As another example, when the user browses the page with attention to a right region 602, it is possible to extract the word "Taro Suzuki".

Figure 7:
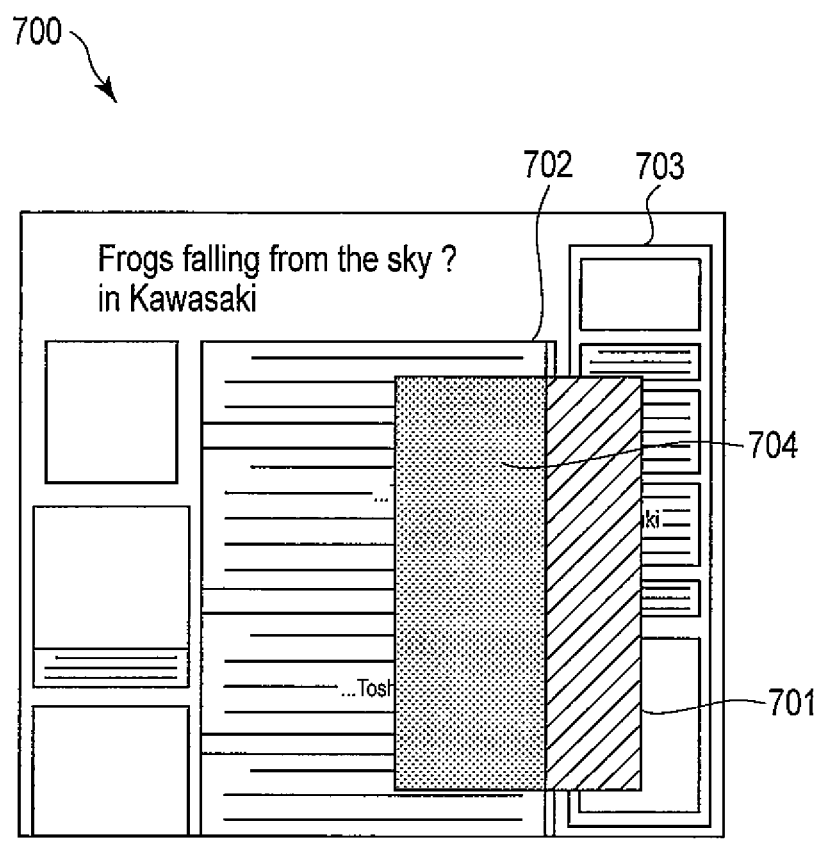
FIG. 7 is a diagram illustrating relation between a block region, the display region, and a region of interest in the browsed information illustrated in FIG. 3.

FIG. 7 illustrates relation between block regions, the display region, and the region of interest, as an example. A region which is the same as the region 401 in FIG. 4 is illustrated as an example of a display region 701 in a screen 700 illustrated in FIG. 7. FIG. 7 shows an example in which two regions are extracted as block regions. For example, a region 702 which includes the article and a region 703 which includes advertisements are extracted as block regions. In the example, among the two block regions 702 and 703, the block region 702 which includes the article that has a larger area overlapping the display area 701 is determined as a region in which the user is interested. A region in which the block region 702 overlaps the display region 701 is extracted as a region of interest 704.

Figure 8:
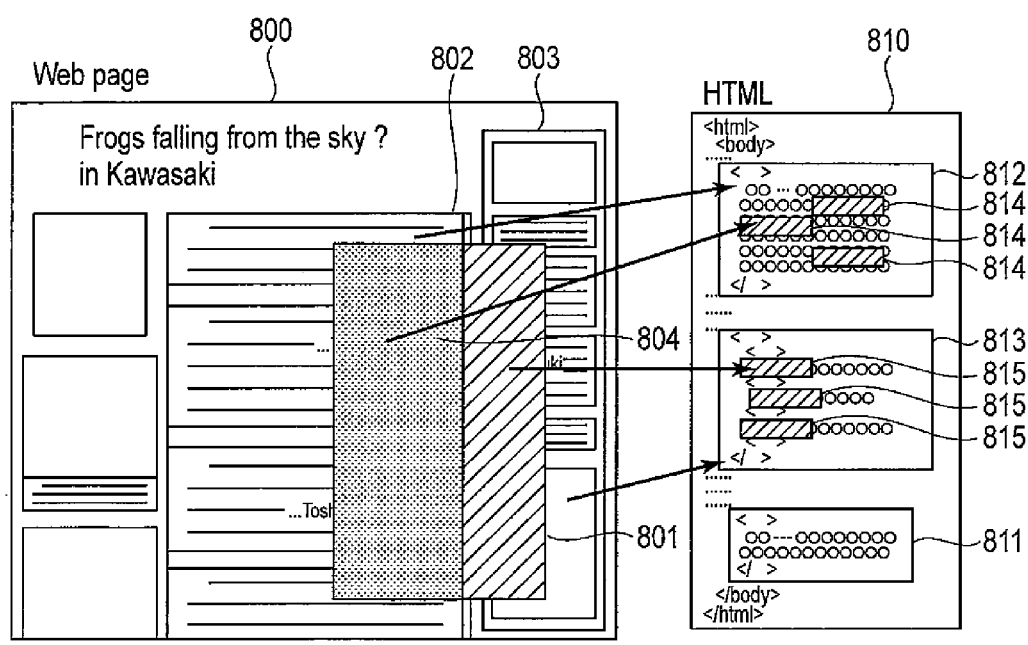
FIG. 8 is a diagram illustrating relation between layout of the block region, the display region, and the region of interest and an HTML document in the browsed information illustrated in FIG. 3.

FIG. 8 illustrates an example of estimating a block region based on relation to the display region. A screen 800 which is illustrated in FIG. 8 shows block regions 802 and 803 and a display region 804 which are the same as those in FIG. 7. In addition, an HTML document 810 in FIG. 8 shows ranges of HTML elements which correspond to parts of the block regions 802 and 803, that are included in the display region 804. The block regions 802 and 803 in the Web page 800 correspond to elements 812 and 813, respectively, in the HTML document 810. The browsed information acquisition unit 101 checks whether each element included in the HTML document 810 is displayed on the screen at present. The parts which are included in the display region 801 among the block regions 802 and 803 correspond to parts 814 and 815, respectively, in the HTML document 810. It is determined by the functions of the Web browser and the operating system in which coordinates on the screen an HTML element is displayed. In this processing, the HTML document is structured and described by tag description. In the present embodiment, each element (for example, ranges 812, 813 and 816 in the HTML document illustrated in FIG. 8) which includes a fixed number of, or at least a fixed percentage of, character string length is extracted as a block region, among HTML elements, each of which is defined by a start tag and an end tag. When words which are included in different HTML elements are arranged close to each other on the screen, it is difficult for the method of classifying words into regions according to arrangement on the screen to recognize these words as belonging to different regions. In the above method, however, it is possible to recognize these words as words belonging to different regions (block regions). For example, although the article region 802 and the advertisement region 803 are arranged close to each other (close coordinates), the regions are included in different elements in the HTML document, and thus dealt as different block regions.

FIG. 9A and FIG. 9B illustrate examples of information related to the region of interest, which is stored in the region-of-interest storage 105. As illustrated in FIG. 9A, the region-of-interest storage 105 stores a plurality of block regions which are extracted for each URL of the displayed Web page. As illustrated in FIG. 9B, the region-of-interest storage 105 also stores a list of block regions which are being displayed, that is, block regions which are included in the display region, for each of the times. A region-of-interest flag is assigned to the region of interest which is determined by the above method.

Figure 10:
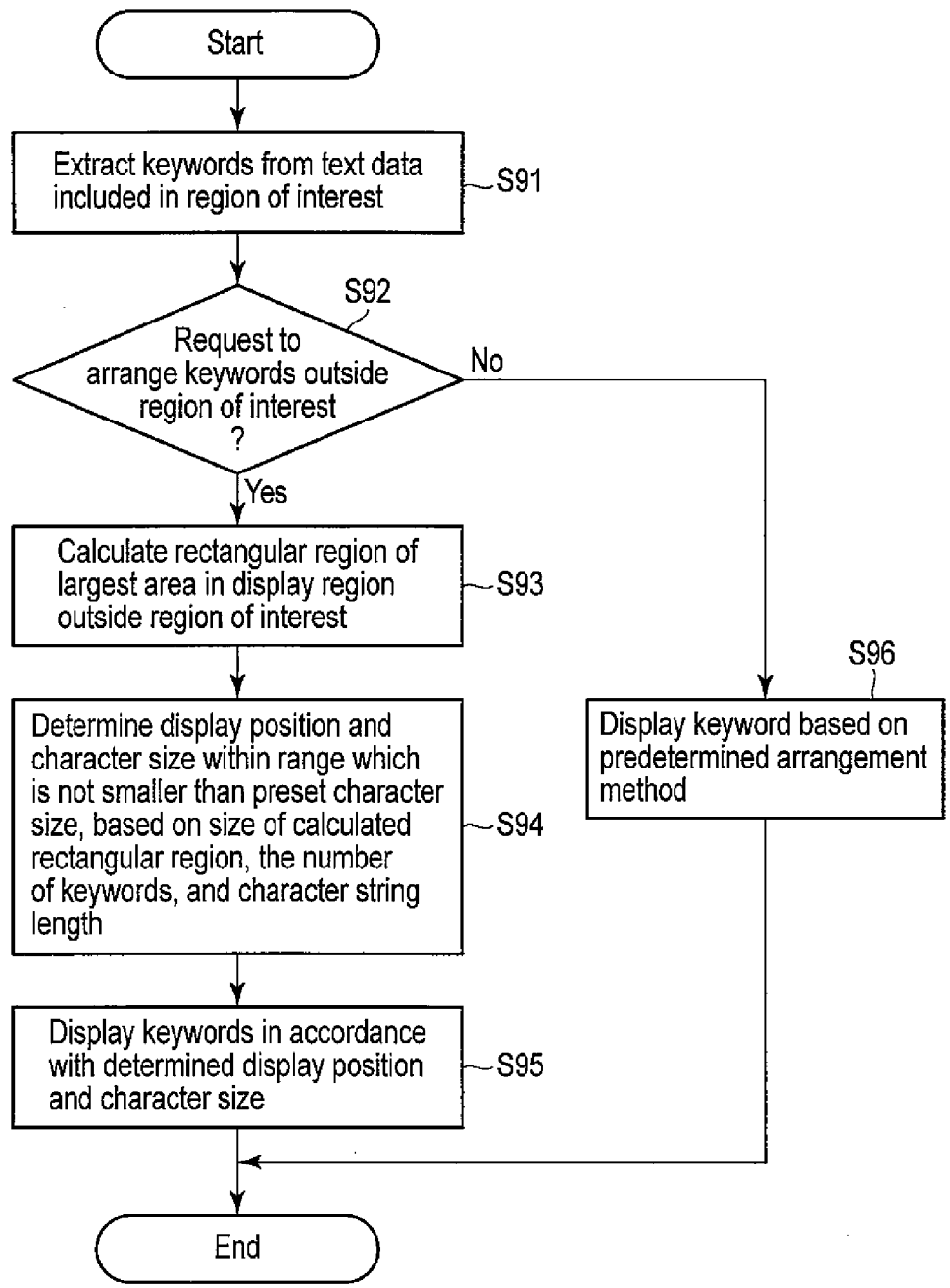
FIG. 10 is a flowchart illustrating process of extracting and displaying keywords.

FIG. 10 illustrates an example of a process of extracting and displaying keywords according to the present embodiment. As illustrated in FIG. 10, keywords are extracted from text data in an HTML element included in the region of interest, that is, a character string (text) included in the region of interest in the display screen (Step S91). As the keyword extraction method, a general keyword extraction method is used such as morphological analysis, named entity extraction, and extraction by matching a word with words included in a dictionary registered in advance.

Then, it is determined whether the keywords extracted in Step S91 are arranged in a region outside the region of interest (Step S92). This determination is executed, for example, in accordance with the operation mode of the region-of-interest extraction apparatus 100 which is set by the user. When it is required to arrange the keywords outside the region of interest, the process goes to Step S93. In Step S93, a largest rectangular region which is located in the displayed region and outside the region of interest is calculated. Thereafter, a display position (for example, coordinates in the display screen) and a character size are determined, in such a manner that the character size is not smaller than the preset character size, based on the area of the rectangular region calculated in Step S93, the number of keywords extracted in Step S91, and the character string length of each keyword (Step S94). Then, the keywords are arranged and displayed in accordance with the display position and the character size determined in Step S94 (Step S95).

When it is not required in Step S92 to arrange the keywords in a region outside the region of interest, the process goes to Step S96. In Step S96, the keywords extracted in Step S91 are arranged and displayed in accordance with a predetermined arrangement method (Step S96). In this case, a predetermined number of keywords are selected from the keywords extracted in Step S91, and the selected keywords are displayed in a lower right part of the display screen, for example.

Figure 11:
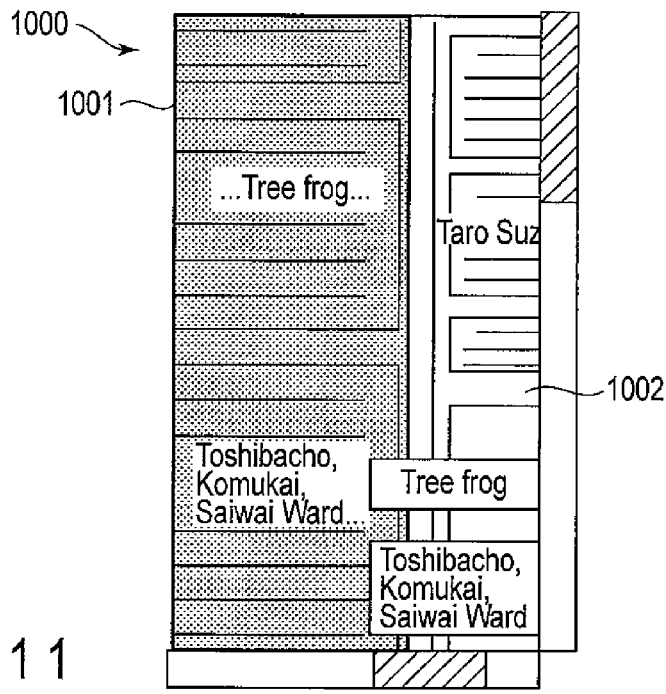
FIG. 11 is a diagram illustrating an example of arrangement of extracted keywords.

FIG. 11 illustrates a display picture example 1000 in the case where keywords are arranged outside the region of interest. In the example of FIG. 11, three keywords are included in keyword candidates which are extracted by the keyword extraction unit 106, like the example of FIG. 6. In the example, when the region of interest is extracted as a block region 1001 (for convenience' sake, the region of interest is shown in dark color in FIG. 11), the two keywords "tree frog" and "Toshibacho, Komukai, Saiwai Ward" included in the block region 1001 are extracted as keywords extracted by the keyword extraction unit 106. The keywords extracted by the keyword extraction unit 106 are displayed in a region 1002, which is obtained as a rectangular region outside the region of interest. In the example of FIG. 11, it is necessary to reduce the character size to be smaller than the preset size to display the keywords to prevent the keywords from overlapping the region of interest 1001, and the extracted keywords are displayed with a minimum predetermined character size. As described above, when the region 1002 outside the region of interest, that is, the region 1002 in which the keywords, are arranged is small, part of the keywords to be displayed may be drawn to overlap the region of interest 1002.

Although the method of arranging the keywords in the present embodiment determines whether the keywords are arranged outside the region of interest or not, the method is not limited to it, but the method may determine coordinates in which the keywords are arranged, or change the transmittance of a drawing range including the keywords to be displayed. For example, the transmittance of drawing of the keywords displayed on the region of interest 1001 may be increased, to prevent the keywords from hiding the content of the Web page in the region of interest.

Next, a flow of selecting a keyword displayed on the screen for retrieval will be explained hereinafter, with reference to FIG. 12 and FIG. 13.

Figure 12:
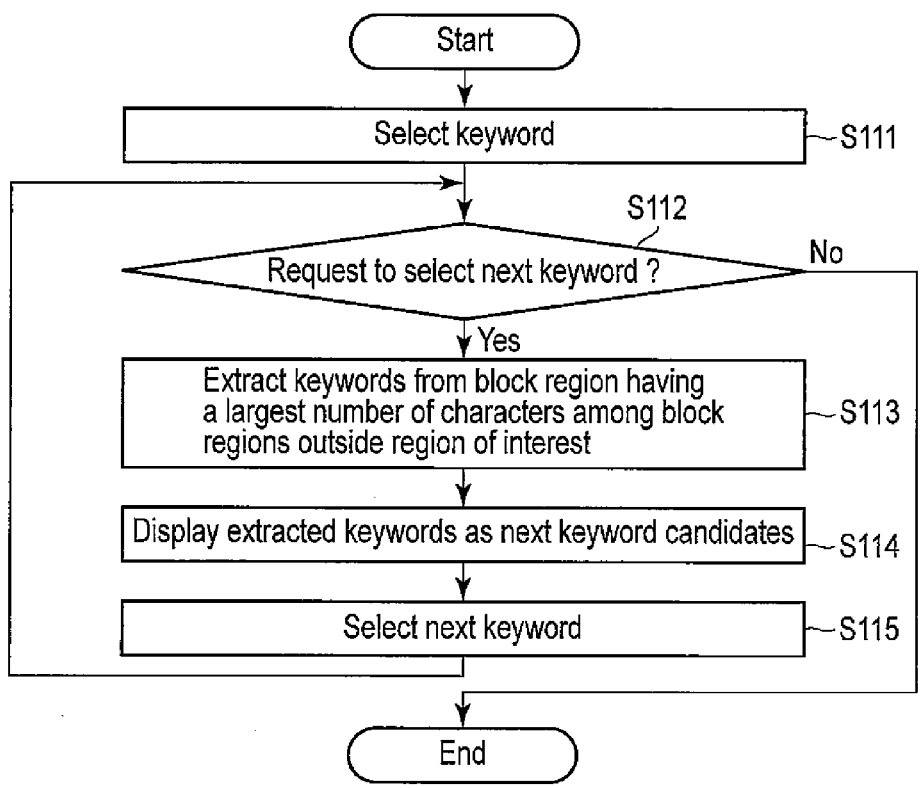
FIG. 12 is a flowchart illustrating process of selecting the extracted keywords.

FIG. 12 illustrates a processing flow of keyword selection according to the present embodiment.

First, the user selects a keyword displayed by the keyword display unit 108 (Step S111). Next, it is determined whether a next (second) keyword selecting operation is performed or not, based on the predetermined operation mode of the region-of-interest extraction apparatus 100 or a user's request (Step S112). When a second keyword selecting operation is performed, the process goes to Step S113. One or more keywords are extracted from a block region having a largest number of characters, among block regions excluding the block region that is included in the region of interest (Step S113). Then, the extracted keywords are displayed as second keyword candidates (Step S114). When there is a keyword to be selected among the presented keywords, the user selects the keyword (Step S115). When a third or later keyword is selected, Steps S113 to S115 are repeated. When no additional keyword is selected in Step S112, the processing is ended.

Although keywords are extracted from a block having a largest number of characters in the processing in Step S113 of FIG. 12, the processing is not limited to it. For example, keywords may be extracted from an HTML element which is identified by a title tag, keyword may be extracted from a block region which is displayed in a highest part of the display screen, or keywords may be extracted by another method.

Figure 13:
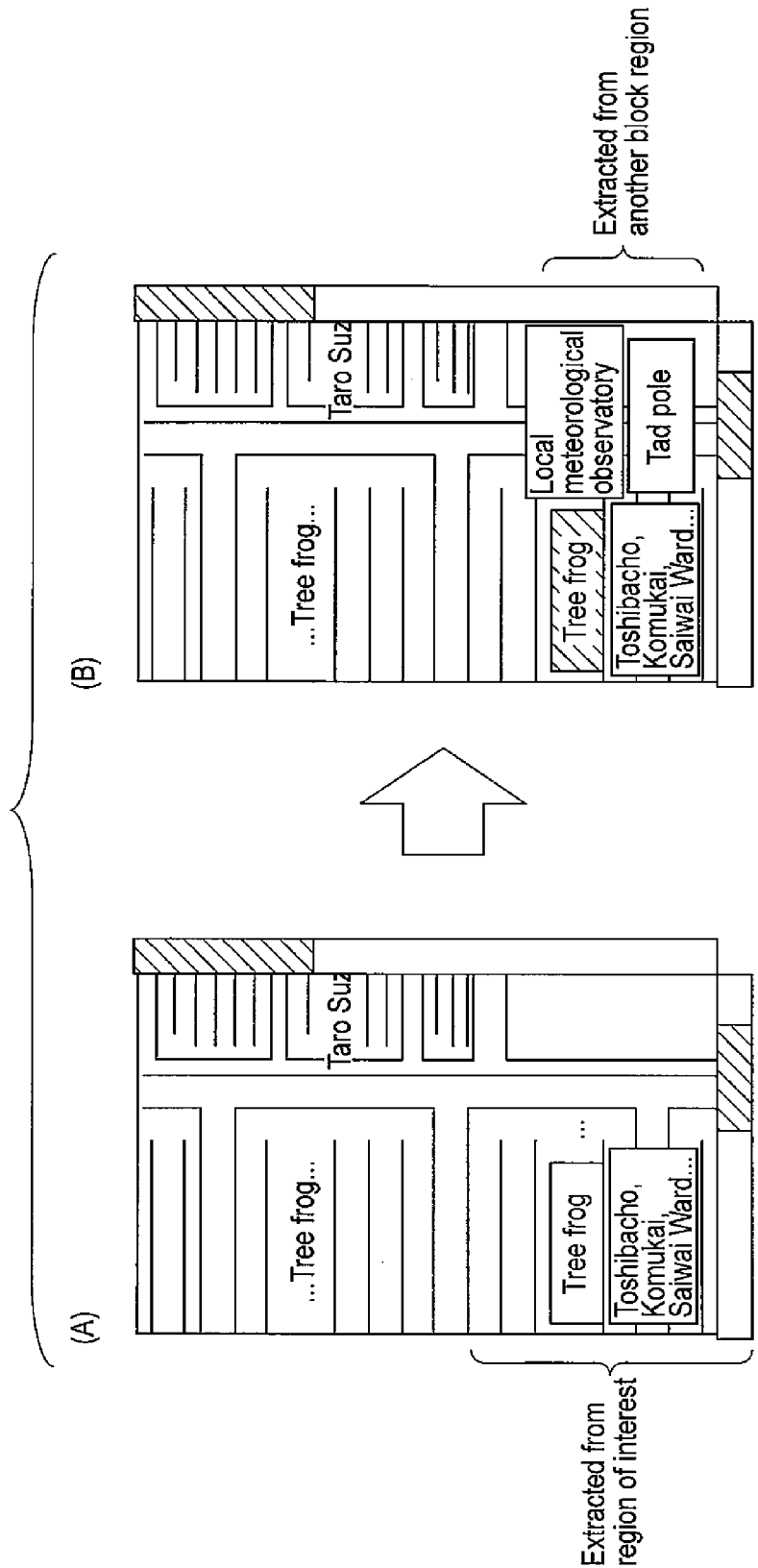
FIG. 13 is a diagram illustrating an example of a display picture in the case where extracted keywords are selected.

FIG. 13 illustrates an example in which two keywords are selected. In FIG. 13A, two keyword candidates "tree frog" and "Toshibacho, Komukai, Saiwai Ward" which are extracted from the region of interest are presented. For example, when the user selects the keyword "tree frog", the selected keyword is highlighted as illustrated in FIG. 13B, and next keyword candidates "local meteorological observatory" and "tadpole" are presented in a right part of the screen.

As described above, for example, while the user views a news site, when the user wishes to know about words, which the user is interested in, in the browsed article or related Web pages, keywords that are included in the article are extracted and presented to the user. As another example, when the user browses an advertisement or a menu, not an article, in the same Web page, it is possible to extract words that are included in the browsed region, and not present keywords included in the text of the article.

Next, a flow of keyword retrieval based on keywords selected by the user will be explained hereinafter with reference to FIG. 14.

Figure 14:
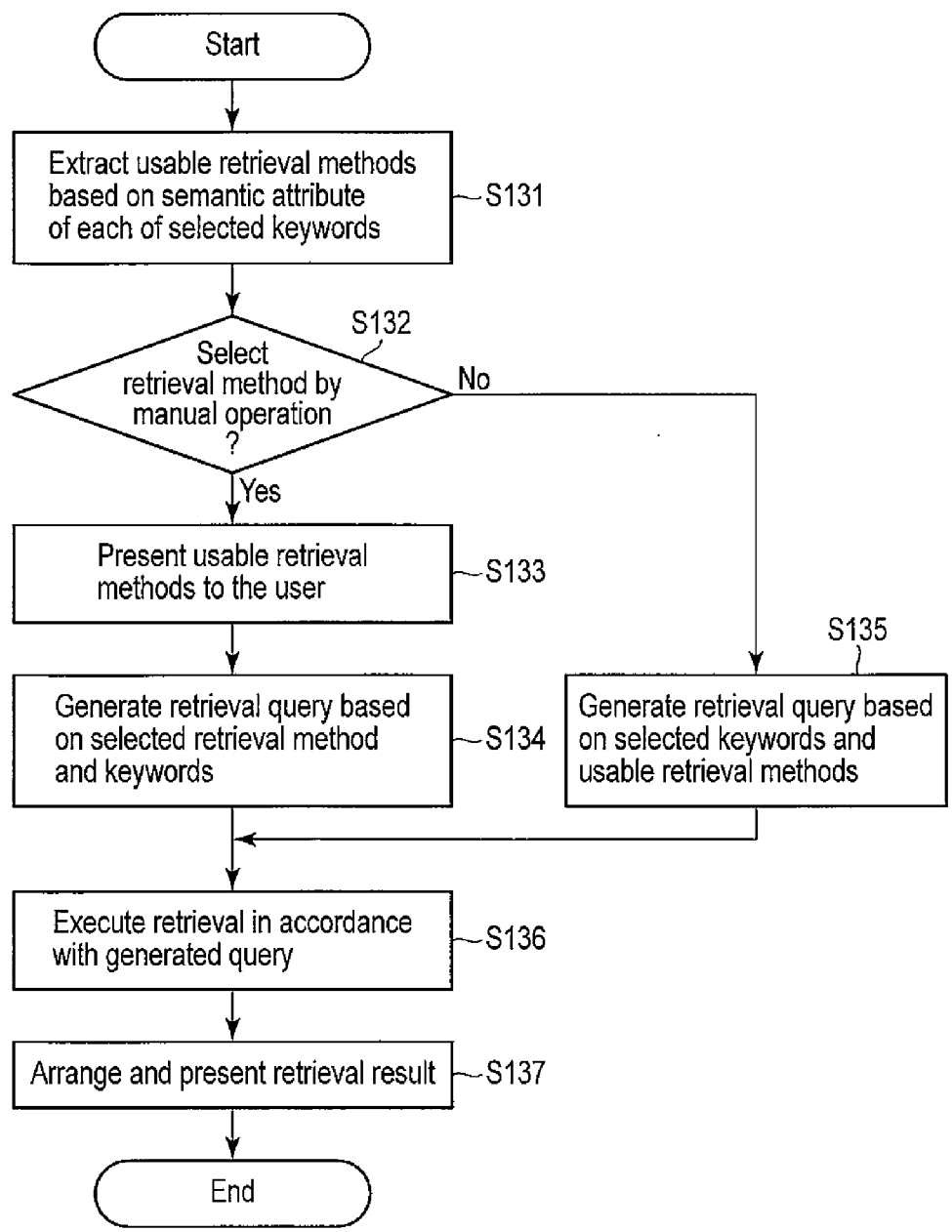
FIG. 14 is a flowchart illustrating process of performing retrieval in accordance with the extracted keywords.

FIG. 14 illustrates a processing flow of keyword retrieval according to the present embodiment. First, possible retrieval methods are extracted with reference to the retrieval rule storage 110, based on property of each keyword selected by the user, such as a part of speech and semantic attribute (Step S131). Next, it is determined whether the retrieval method is selected by manual operation, that is, whether the user selects the retrieval method or not, in accordance with a predetermined operation mode (Step S132). When selection is performed by manual operation, the process goes to Step S133. Usable retrieval methods are presented to the user in Step S133. Then, a retrieval query is generated based on the retrieval method and the keywords selected by the user (Step S134). When the retrieval query is generated, the retrieval unit 111 executes retrieval with the selected retrieval method and the generated retrieval query (Step S136), and the retrieval result display unit 112 arranges a retrieval result and presents the result to the user (Step S137).

When it is determined in Step S132 that the retrieval method is not selected by manual operation, the retrieval method is selected in accordance with the predetermined operation mode, and a retrieval query is generated based on the selected keyword and the selected retrieval method in Step S135.

Although it is supposed that retrieval using a web service is used in the present embodiment, retrieval methods other than a web service may be used, such as database retrieval using a dictionary or the like that is stored in the region-of-interest extraction apparatus 100 itself.

Figure 15:
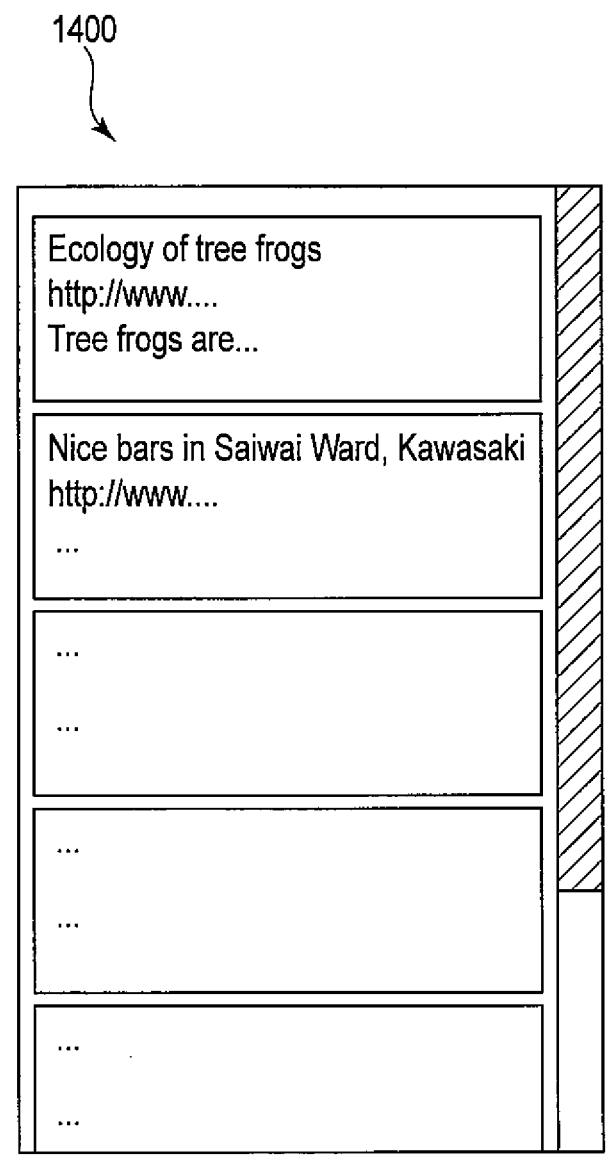
FIG. 15 is a diagram illustrating a picture of a retrieval result obtained by the retrieval processing of FIG. 14.

FIG. 15 illustrates an example of a retrieval result picture 1400, which is presented to the user after retrieval is performed based on the retrieval keywords selected by the user. When the user selects one of the retrieval results presented in the picture 1400, the picture is changed to the selected Web page, and next browsed information is acquired by the browsed information acquisition unit 101. In keyword retrieval, retrieval is performed in accordance with the property of the keywords selected by the user. For example, when a place name such as "Saiwai Ward, Kawasaki" is selected as a retrieval keyword, information relating to restaurants and usable public transport is retrieved and presented to the user.

As described above, the region-of-interest display apparatus 100 according to the present embodiment can extract a region of interest and keywords which the user is interested in when the user browses a Web page, and retrieves information relating to the keywords selected by the user, and presents the information to the user.

In the browsed information acquisition unit 101, a keyword which indicates the situation in which the user is may additionally be acquired, in addition to the Web page. For example, when the Web browser is mounted to a portable terminal, the user may input a word such as "Kawasaki" as a keyword which indicates the place where the user is at present.

As described above, although it is supposed in the present embodiment that the region-of-interest extraction apparatus 100 is used in a terminal which the user possesses, the region-of-interest extraction apparatus 100 may be divided between a plurality of apparatuses. For example, part of the region-of-interest extraction apparatus 100 is formed on a server. The region-of-interest extraction apparatus 100 may be applied to an ordinary computer which includes a controller such as a CPU, a storage device such as a ROM and a RAM, an external storage device such as an HDD, a display device such as a display, and an input device such as a keyword and a mouse.

In addition, the region-of-interest extraction apparatus of the above embodiment may be realized by using, for example, a general purpose computer as basic hardware. Specifically, the browsed information acquisition unit 101, the block region extraction unit 102, the display region extraction unit 103, the region-of-interest extraction unit 104, the keyword extraction unit 106, the arrangement calculation unit 107, the keyword display unit 108, the retrieval method determination unit 109, the retrieval unit 111, and the retrieval result display unit 112 can be realized by causing a processor that is mounted to the above computer to execute a program. In the case of adopting the above structure, the program to be executed has a module structure including the above functions.

The region-of-interest extraction apparatus may be realized by installing the above program in the computer in advance. Alternatively, the region-of-interest extraction apparatus may be realized by recording the above program in a file of a installable or executable form on a storage medium that is readable by a computer, such as a CD-ROM, a Floppy disk, a CD-R, and a DVD, or distributing the above program through a network, and properly installing the program in a computer. Besides, the region-of-interest storage 105 and the retrieval rule storage 110 may be realized by properly using a built-in or external memory or hard disk of the computer, or a storage medium such as a CD-R, a CD-RW, a DVD-RAM, and a DVD-R.

According to the above-described embodiment, it is possible to extract a region in which the user is interested from a document browsed by the user. The region-of-interest extraction apparatus according to the present embodiment can improve operability of document browse in apparatuses which have a small display screen, such as portable apparatuses.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A region-of-interest extraction apparatus comprising:
    an acquisition unit configured to acquire a structured document and a plurality of display coordinates, the structured document including a plurality of first elements, the plurality of display coordinates indicating display positions of the a plurality of first elements when the structured document is displayed as an image;
    a first extraction unit configured to extract a plurality of block regions from the structured document, the plurality of block regions including a plurality of specific second elements of the plurality of first elements;
    a second extraction unit configured to specify one or more third elements displayed on a display screen based on plurality of display coordinates, and to extract, as a display region, displayed parts of the one or more third elements from the structured document; and
    a third extraction unit configured to extract, as a region of interest in which a user is interested, a block region from the plurality of block regions, the block region having an area in the display screen that is increased based on a difference between an area of the display screen from an extraction result obtained after scrolling and an area of the display screen from a previous extraction result based on an earlier time before scrolling and stored in a region-of-interest history storage.

2. The apparatus according to claim 1, wherein the acquisition unit generates the plurality of display coordinates based on the structured document.

3. The apparatus according to claim 1, further comprising:
    a fourth extraction unit configured to extract one or more keywords included in the region of interest; and
    a display unit configured to display the keywords on the display screen.

4. The apparatus according to claim 3, further comprising:
    a retrieval unit configured to retrieve, when a keyword is selected from the keywords by the user, information relating to the keyword to output a retrieval result; and
    a retrieval result display unit configured to display the retrieval result on the display screen.

5. A region-of-interest extraction method comprising:
    acquiring a structured document and a plurality of display coordinates, the structured document including a plurality of first elements, the plurality of display coordinates indicating a plurality of display positions of the plurality of first elements when the structured document is displayed as an image;
    extracting a plurality of block regions from the structured document, the plurality of block regions including specific second elements of the plurality of first elements;
    specifying one or more third elements displayed on a display screen based on the plurality of display coordinates;
    extracting, as a display region, displayed parts of the third elements from the structured document; and
    extracting, as a region of interest in which a user is interested, a block region from the plurality of block regions, the block region having an area in the display screen that is increased based on a difference between an area of the display screen from an extraction result obtained after scrolling and an area of the display screen from a previous extraction result based on an earlier time before scrolling and stored in a region-of-interest history storage.

6. A non-transitory computer readable medium including computer executable instructions, wherein the instructions, when executed by a processor, cause the processor to perform a method comprising:

acquiring a structured document and a plurality of display coordinates, the structured document including a plurality of first elements, the plurality of display coordinates indicating display positions of the plurality of first elements when the structured document is displayed as an image;

extracting a plurality of block regions from the structured document, the plurality of block regions including specific second elements of the plurality of first elements;

specifying one or more third elements displayed on a display screen based on the plurality of display coordinates;

extracting, as a display region, displayed parts of the one or more third elements from the structured document; and extracting, as a region of interest in which a user is interested, a block region from the plurality of block regions, the block region having an area in the display screen that is increased based on a difference between an area of the display screen from an extraction result obtained after scrolling and an area of the display screen from a previous extraction result based on an earlier time before scrolling and stored in a region-of-interest history storage.

* * * * *